US 10,132,264 B2

(12) United States Patent
Graf et al.

(10) Patent No.: US 10,132,264 B2
(45) Date of Patent: Nov. 20, 2018

(54) METHOD FOR CONTROLLING AN ELECTRIC MOTOR OF A VEHICLE PUMP (71) Applicant: CONTINENTAL AUTOMOTIVE GmbH, Hannover (DE)

(72) Inventors: Rolf Graf, Glashütten (DE); Bernhard Lukas, Mörfelden-Walldorf (DE)

(73) Assignee: Continental Automotive GmbH, Hannover (DE)

(*) Notice: Subject to any disclaimer, the term of this patent is extended or adjusted under 35 U.S.C. 154(b) by 210 days.

(21) Appl. No.: 15/029,573

(22) PCT Filed: Oct. 14, 2014

(86) PCT No.: PCT/EP2014/072038
§ 371 (c)(1),
(2) Date: Apr. 14, 2016

(87) PCT Pub. No.: WO2015/055666
PCT Pub. Date: Apr. 23, 2015

(65) Prior Publication Data
US 2016/0265471 A1 Sep. 15, 2016

(30) Foreign Application Priority Data

Oct. 15, 2013 (DE) .................. 10 2013 220 825

(51) Int. Cl.
H02P 6/10 (2006.01)
F02D 41/30 (2006.01)
(Continued)

(52) U.S. Cl.
CPC ......... F02D 41/3082 (2013.01); F02M 59/12 (2013.01); F04C 2/10 (2013.01);
(Continued)

(58) Field of Classification Search
CPC ........................................ H02P 6/10
(Continued)

(56) References Cited

U.S. PATENT DOCUMENTS

| 5,239,241 A * | 8/1993 | Hash | H02P 6/04 318/103 |
| 6,749,402 B2 * | 6/2004 | Hogan | B01F 13/1055 222/333 |
| 8,353,690 B2 * | 1/2013 | Hogan | B01F 5/12 417/492 |

FOREIGN PATENT DOCUMENTS

| CN | 101278115 | 10/2008 |
| DE | 10 2005 043817 | 3/2007 |

(Continued)

OTHER PUBLICATIONS

Oct. 4, 2013 XP007922929 http://de.wikipedia.org/w/index.php?title=Regler&Oldid=123150678.
(Continued)

Primary Examiner — David S Luo
(74) Attorney, Agent, or Firm — Cozen O'Connor (57) ABSTRACT A method for controlling an electric motor of a vehicle pump used to deliver a medium. According to the method, a period required for at least one partial revolution of a rotor of the electric motor is determined. The fluctuations during the period can represent a measurement of the true running of the electric motor. The speed of the electric motor can be altered depending on the deviation of the period from a comparative value. As a result, the true running of the electric motor can be guaranteed once again.

10 Claims, 4 Drawing Sheets (51) Int. Cl.
    *H02P 6/06*           (2006.01)
    *H02P 6/182*        (2016.01)
    *F02M 59/12*        (2006.01)
    *F04C 2/10*         (2006.01)
    *F02D 41/14*        (2006.01)

(52) U.S. Cl.
    CPC .................. *H02P 6/06* (2013.01); *H02P 6/10* (2013.01); *H02P 6/182* (2013.01); *F02D 41/1498* (2013.01); *H02P 2207/05* (2013.01)

(58) Field of Classification Search
    USPC .................. 318/400.34, 400.32, 400.01, 700
    See application file for complete search history.

(56) References Cited

FOREIGN PATENT DOCUMENTS

| | | |
|---|---|---|
| EP | 2 192 686 | 6/2010 |
| JP | 63-48179 | 2/1988 |
| JP | 2001-275391 | 10/2001 |

OTHER PUBLICATIONS

Office Action dated May 4, 2017 which issued in the corresponding Chinese Patent Application No. 201480056490.5.

\* cited by examiner

METHOD FOR CONTROLLING AN ELECTRIC MOTOR OF A VEHICLE PUMP

CROSS REFERENCE TO RELATED APPLICATIONS

This is a U.S. national stage of application No. PCT/EP2014/072038, filed on Oct. 14, 2014. Priority is claimed on German Application No. DE102013220825.1, filed Oct. 15, 2013, the content of which is incorporated here by reference.

BACKGROUND OF THE INVENTION

1. Field of the Invention

The invention relates to a method for controlling an electric motor of a vehicle pump, a program element, a delivery device of a vehicle, and a vehicle.

2. Description of the Prior Art

Typical fuel pumps for diesel fuel can have a pumping unit that according to the displacement principle. An example of this can be the gerotor pump or gear ring pump. Screw and roller vane pumping units can also be used as fuel pumps. During the operation of fuel pumps, different operating states can occur depending on the pressure and the viscosity of the medium to be delivered. Since pumping units which work by the displacement principle can typically have a high hydraulic-mechanical rigidity, a change in the viscosity or the pressure of the delivered medium can have a direct impact on the necessary torque needed to drive the pump.

At present, electrically commutated motors can be used in fuel pumps. These are synchronous machines that may have fluctuations in the available output torque over the course of the angle of rotation of the rotor, owing to their design. Moreover, typical displacement pumps can have fluctuating load torques over the course of the angle of rotation. A brief exceeding of the available output torque of the electric motor, due to the load torque of the pump, can result in a loss of synchronization between rotor and driving field. This can result in a drop in speed and a loss of control of the electronics over the electric motor with subsequent pump standstill.

Moreover, other disruptive effects can occur in pumps with gerotor mechanism when they are operated at low speed. Due to manufacturing tolerances, there may also be fluctuations in the required torque over several revolutions of the gerotor. These periodic fluctuations in load torque together with the fluctuations in the output torque of the electric motor due to rotor angle can result in both fluctuations in the true running of the pump over several of its revolutions and fluctuations over partial revolutions. Typically, the electronics of the pump can work as a speed regulator of the fuel pump according to a speed setpoint signal from the engine controls. At low speed of the pump or the electric motor and at certain pressures in the pumping unit, this mechanically inducted behavior can even lead to a loss of control of the electronics over the pump and thus to a pump standstill.

SUMMARY OF THE INVENTION

One aspect of the invention is to improve the operation/actuation of electric motors in pumps.

A first aspect of the invention concerns a method for controlling an electric motor of a vehicle pump for the delivery of a medium. The method involves the steps of ascertaining a period for at least a partial revolution of a rotor of the electric motor and altering a speed of the electric motor when the ascertained period for the partial revolution of the rotor deviates from a predetermined comparison value by a minimum amount.

A method is provided for regulating the speed of the electric motor of a vehicle pump. In other words, the method can be used to verify or monitor the true running of the electric motor. When the true running of the electric motor reaches a certain instability, the speed of the electric motor can be adjusted according to defined setpoints, so that the instability of the true running of the electric motor is reduced. The altering of the speed of the period can involve, for example, the sending of a signal for changing the speed to the electric motor. The mentioned setpoints, rules, or commands, can be deposited in a storage unit as part of a control program for the electric motor.

The methods described in the context of one aspect the present invention can be carried out by an electronic control unit. The steps of the method mentioned above and in what follows can be carried out in the mentioned sequence. Moreover, other sequences are possible, as is parallel performance of certain steps. The pump can be a fuel pump and/or a diesel pump. The pump can be designed as a gerotor pump or a gear ring pump. Moreover, the pump can also be designed as a screw pump or a roller vane pump.

The period for at least one partial revolution can designate a period of time required by the rotor of the electric motor for the partial revolution. The feature "at least" means that it may involve a partial revolution, a complete revolution, more than one revolution or several revolutions of the rotor. In this regard, the feature "at least" pertains to the feature "partial" of the term partial revolution. Thus, it can be enough to determine the required rotation time of the rotor for a circle segment, but also other measurements are possible in the sense of the invention, such as measurement of the rotation time of the rotor for one sixth of a revolution, for one quarter of a revolution, for one third of a revolution, for one half of a revolution, for three quarters of a revolution, for a whole revolution and/or for two revolutions. The predetermined comparison value can designate a comparison value that is dictated from the outside. That is, the comparison value can be dictated by another unit or by a user. Moreover, the predetermined comparison value can be implemented or stored permanently in a control unit that executes the method.

Figure 1:
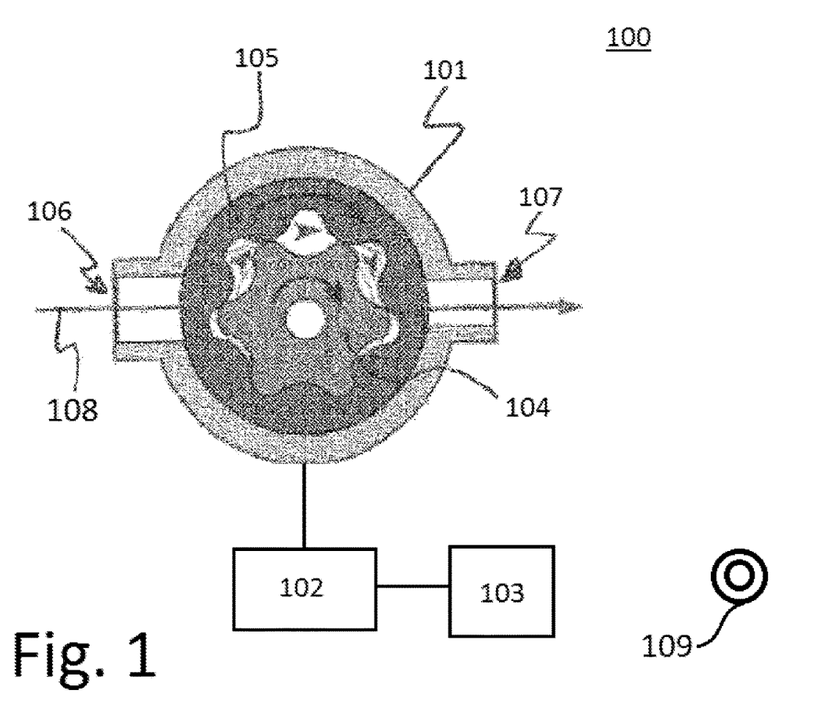
FIG. 1 is a delivery device.
Figure 4:
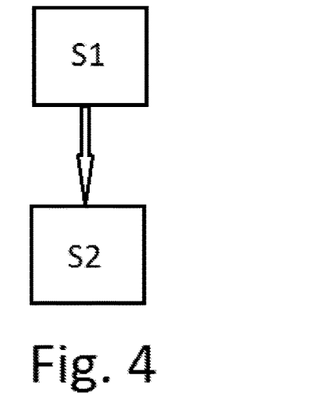
FIG. 4 is a flowchart of a method.

However, the predetermined comparison value can also be ascertained and determined by the control unit, which executes the method. This determination can follow certain rules that can be stored in a storage unit. By the feature that the ascertained period deviates from the predetermined comparison value by a minimum amount one can understand that an absolute magnitude of a difference between period and comparison value must be greater than or equal to the minimum amount in order to initiate a corresponding speed regulation. In other words, this can mean that the ascertained period deviates from the predetermined comparison value by the minimum amount or more. The speed of the electric motor can designate a speed or a rotary frequency of the rotor of the electric motor. That is, by speed can be understood the number of revolutions which the rotor executes or will execute within a predetermined time, for example, in one minute. In other words, the speed can designate a rotational speed of the rotor. In the context of the present invention, one can use the designation that the electric motor is running untrue when the period deviates from the predetermined comparison value by the minimum amount or more, and that the electric motor is running true when the deviation of the period from the predetermined comparison value is less than the minimum amount. FIG. 4 shows a flow chart of one such method, which can be carried out with a delivery device as shown in FIG. 1, for example.

The method can assure true running of the electric motor or the pump. Moreover, it can prevent strong instabilities from occurring in the electric motor or pump, which could result in a standstill of the pump. That is, among other things, the stability of the pump operation can also be enhanced by the method according to the invention and thereby pump malfunctions can be reduced.

According to one embodiment of the invention, the method furthermore has the steps of detecting an electromotive force of the electric motor and determining a period of the detected electromotive force of the electric motor, by which the period for the partial revolution of the rotor is ascertained.

In other words, by this method one can measure an electromotive force. This measurement of the electromotive force can be done continuously. Moreover, it is also possible to detect the electromotive force periodically or at irregular intervals. In this context, one can use the abbreviation e.m.f. for the electromotive force. By electromotive force, one can understand a counter-e.m.f. This electromotive force or counter-e.m.f. can designate a voltage induced in the conductor winding by the rotation of the rotor conductor winding in a magnetic field of the stator. This electromotive force can have fluctuations in time, which have a definite period. The regularity of the period of the electromotive force can be a measure of the true running of the electric motor or the pump. This regularity is ascertained and/or monitored with the method and the device of the present invention. The electromotive force can be measured directly in the electric motor, without the need for additional sensors. The electromotive force can be given in actuation electronics of the electric motor, so that it does not have to be measured in addition. In this way, the true running can be monitored in a simple manner, without the need for additional sensors. This solution is cost-neutral, low-maintenance, and hardly error-prone.

Another exemplary embodiment of the invention concerns a delivery device with a control unit, wherein the control unit is designed to detect an electromotive force of the electric motor. The control unit is also designed to ascertain the period for the partial revolution of the rotor by a determination of a period of the detected electromagnetic force of the electric motor. The advantages and features mentioned in connection with the method also apply to the delivery device, and the delivery device can carry out the method.

According to one embodiment of the invention, the method furthermore has the step of calculating a difference between the determined period of the monitored electromotive force of the electric motor and the predetermined comparison value. This method also contains the step of altering the speed of the electric motor when an absolute magnitude of the calculated difference is greater than the minimum amount. The predetermined comparison value here is a mean value of a particular number of periods of the electromotive force of the electric motor.

In other words, the method can also have the step of ascertaining a mean value of a particular number of periods of the electromotive force of the electric motor. The ascertaining of the mean value can involve the determining of an arithmetic mean of the particular number of periods. The particular number can be predetermined. Moreover, the particular number of periods can also be variable. For example, the particular number of periods can be dependent on how long the pump or the electric motor has been in true running. This deviation of the period from the mean value of the period can be called "jitter" in technical parlance. In this way, one can ascertain in a simple and exact manner whether the speed of the electric motor should be altered or not. The ascertaining of the difference and/or the ascertaining of the mean value can be done automatically by a control unit or by an electronic component, so that the method can be implemented in a control unit.

One embodiment of the invention concerns a delivery device and designed to calculate a difference between the determined period of the monitored electromotive force of the electric motor and the predetermined comparison value. Moreover, the predetermined comparison value is a mean value of a particular number of periods of the electromotive force of the electric motor. The control unit, moreover, is designed to alter the speed of the electric motor when an absolute magnitude of the calculated difference is greater than the minimum amount. The advantages and features mentioned in connection with the method also apply to the delivery device.

According to one embodiment of the invention, the method has the step of increasing the speed of the electric motor by a predefined fixed amount when the ascertained period for the partial revolution of the rotor deviates from the predetermined comparison value by the minimum amount.

In other words, a signal can be sent to the electric motor to increase the speed when the ascertained period for the partial revolution of the rotor deviates from the predetermined comparison value by the minimum amount or when an instability of the true running has been detected. By increasing the speed, one can possibly achieve a reduction of the jitter. In other words, by increasing the speed the duration of the period can be stabilized or the true running improved. In this way, by the method it is possible on the one hand to detect an unstable true running and on the other hand also to correct it.

One embodiment of the invention concerns a delivery device, wherein the control unit is designed to increase the speed of the electric motor by a predefined fixed amount when the ascertained period for the partial revolution of the rotor deviates from the predetermined comparison value by the minimum amount.

According to one embodiment of the invention, the method has the step of continual increasing of the speed of the electric motor until the deviation of the period from the predetermined comparison value is less than the minimum amount, when the ascertained period for the partial revolution of the rotor deviates from the predetermined comparison value by the minimum amount.

In other words, the speed of the electric motor can be increased continually until the electric motor or the pump is again in true running or until the true running of the electric motor is again stable. In this way, the electric motor can be operated with a flexible speed, at which the jitter is below the minimum amount.

One embodiment of the invention concerns a delivery device wherein the control unit is designed for continual increasing of the speed of the electric motor until the deviation of the period from the predetermined comparison value is less than the minimum amount when the ascertained period for the partial revolution of the rotor deviates from the predetermined comparison value by the minimum amount.

According to one embodiment of the invention, the method has the step of generating and sending a warning signal to an engine control unit when the ascertained period for the partial revolution of the rotor deviates from the predetermined comparison value by the minimum amount.

In this way, the engine control unit can adapt the operation of the engine to the pump or the electric motor. For example, the engine control unit can reduce the power or the fuel consumption of the engine when the electric motor of the pump is running untrue.

One embodiment of the invention concerns a delivery device wherein the control unit is designed for generating and sending a warning signal to an engine control unit when the ascertained period for the partial revolution of the rotor deviates from the predetermined comparison value by the minimum amount.

According to one embodiment of the invention, the method has the step of detecting an instantaneous speed of the electric motor. Moreover, the method has the step of increasing the speed of the electric motor if the detected instantaneous speed of the electric motor drops below a first speed limit value, when the ascertained period for the partial revolution of the rotor deviates from the predetermined comparison value by the minimum amount, or the step of decreasing the speed of the electric motor if the ascertained instantaneous speed of the electric motor goes beyond a second speed limit value, when the ascertained period for the partial revolution of the rotor deviates from the predetermined comparison value by the minimum amount.

Figure 5:
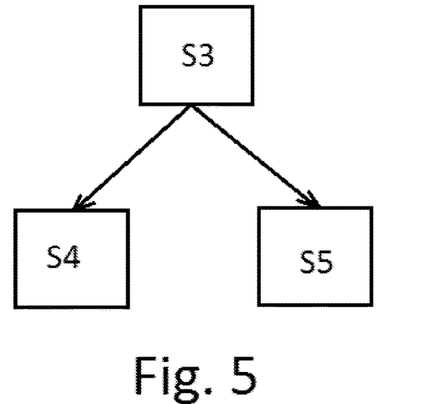
FIG. 5 is a flow chart of a method.
The figures are schematic and not true to scale.

In other words, the method can have two speed ranges, for example, a low speed range and a high speed range. Thus, according to the method, the speed of the electric motor can be increased when the instantaneous speed of the electric motor is in the low speed range. When the instantaneous speed is in the high speed range, the speed of the electric motor can be decreased accordingly if the electric motor is running untrue. Whether the speed at the moment is in the high or low range can be established on the basis of a comparison against memorized values. FIG. 5 shows a flow chart according to one embodiment of the invention for one such method with two speed ranges.

One embodiment of the invention concerns a delivery device that carries out such a method, wherein the control unit is designed to detect an instantaneous speed of the electric motor. The control unit is designed for increasing the speed of the electric motor if the detected instantaneous speed of the electric motor drops below a first speed limit value, when the ascertained period for the partial revolution of the rotor deviates from the predetermined comparison value by the minimum amount. Moreover, the control unit is designed for decreasing the speed of the electric motor if the ascertained instantaneous speed of the electric motor goes beyond a second speed limit value when the ascertained period for the partial revolution of the rotor deviates from the predetermined comparison value by the minimum amount.

According to one embodiment of the invention, the method has the step of decreasing the speed of the electric motor. Moreover, the method has the step of maintaining the decreased speed of the electric motor after the decreasing of the speed if the ascertained period for the partial revolution of the rotor deviates from the predetermined comparison value by an amount which is less than the minimum amount. Alternatively, the method has the step of increasing the decreased speed of the electric motor after the decreasing of the speed if the ascertained period for the partial revolution of the rotor deviates from the predetermined comparison value by the minimum amount.

In this way, according to the method one can verify whether the electric motor can be operated with a lower speed. If the electric motor is running true even with the lower speed, the lower speed can be maintained. Otherwise, the speed can be increased again. In this way, the electric motor can be operated with a lower speed when possible, which can reduce the wear on the pump.

One aspect of the invention concerns a program element which, when executed on a processor, causes the processor to execute a method as described above.

The program element can be loaded onto a control unit that executes the steps of the method. The program element can be part of a computer program. Moreover, the program element can also itself be an independent computer program. For example, the program element as an update can enable an already existing computer program to execute the method according to the invention.

One aspect of the invention concerns a computer-readable medium on which a program element is stored which, when executed on a processor, causes the processor to execute a method as described above.

The computer-readable medium can be considered as a storage medium, such as a USB stick, CD, DVD, hard disk, or some other storage medium. Moreover, the computer-readable medium can also be designed as a microchip, which enables a control electronics to execute the method according to the invention.

One aspect of the invention concerns a delivery device of a vehicle. The delivery device has a pump for the delivery of a medium, an electric motor for driving the pump and a control unit for controlling the electric motor, wherein the electric motor has a rotor. The control unit is designed to ascertain a period for at least a partial revolution of the rotor. Moreover, the control unit is designed to alter a speed of the electric motor when the ascertained period for the partial revolution of the rotor deviates from a predetermined comparison value by a minimum amount.

The pump, the electric motor and the control unit can describe different structural units. Furthermore, it is not necessary for the control unit to be integrated in the delivery device. For example, the control unit can be part of the engine controls. Moreover, the features and advantages described in connection with the method can also apply to the delivery device.

One aspect of the invention concerns a vehicle with a delivery device, such as is described above and in what follows, wherein the pump of the delivery device is a fuel pump for the delivery of fuel to an internal combustion engine of the vehicle.

The features and advantages mentioned in connection with the method can also be applied to the vehicle. The vehicle can also be or have been retrofitted with a control unit which executes the method described in the context of the present invention.

The described embodiments equally pertain to a method, a program element, a computer-readable medium, a delivery device, and a vehicle, even though individual embodiments are described solely in regard to the method, the program element, the computer-readable medium, the delivery device or the vehicle. Synergistic effects can result from different combinations of the embodiments, even if these are not described hereafter.

BRIEF DESCRIPTION OF THE DRAWINGS

Further features, advantages, and application possibilities of the invention will emerge from the following description of exemplary embodiments and the figures. All described and/or graphically represented features form subject matter of the invention in themselves and in any desired combination, regardless of their composition in the individual claims or their back references.

BRIEF DESCRIPTION OF THE DRAWINGS

FIG. 1 shows a delivery device 100 of a vehicle according to one exemplary embodiment of the invention. The delivery device 100 has a pump 101 for the delivery of a medium, an electric motor 102 for the driving of the pump and a control unit 103 for controlling the electric motor 102, wherein the electric motor 102 has a rotor. The control unit 103 is designed to ascertain a period for at least one partial revolution of the rotor. Moreover, the control unit 103 is designed to alter a speed of the electric motor 102 when the ascertained period for the partial revolution of the rotor deviates from a predetermined comparison value by a minimum amount.

According to FIG. 1, the pump 101 is designed as a gerotor pump or gear ring pump. The driving gear 104 here runs eccentrically in the internal toothing 105 of the pump. The gear 104 is driven by the electric motor 102. Owing to the rotation of the gear 104, the medium is delivered between the tooth gaps, the medium being transported from an inlet 106 of the pump 101 to an outlet 107 of the pump 101 in the direction of the arrow 108. The gerotor pump is to be seen merely as an example and is not limiting. The invention can be realized for many different pump types. Manufacturing tolerances of the pump 101, the viscosity, the pressure and the temperature of the medium to be delivered, and also other factors can bring about fluctuations in the load torque of the pump 101. Moreover, an output torque of the electric motor 102 can be different for different angles of the rotor. Owing to the fluctuations in the load torque of the pump 101 and owing to the fluctuations in the output torque of the electric motor 102, fluctuations can occur in the period for a partial revolution, e.g., a partial revolution of 60°, i.e., a "jitter". Moreover, the electric motor 102 can be designed as an electrically commutated motor or a brushless electric motor. By a control unit, alternating voltage can be supplied to a stator of the electric motor, setting the rotor in rotation. If the "jitter" becomes too large, this can result in a loss of control of the control unit supplying the alternating current to the stator, which in turn can result in a pump standstill. To prevent this, the control unit 103 is designed to monitor the "jitter" of the electric motor 102 and to alter the speed of the electric motor when the "jitter" becomes too large. The control unit 103 can be a component of the delivery device 100. But it is also possible for the control unit 103 to not be an integrated structural unit of the delivery device 100, but rather part of the engine controls, for example. For example, the already existing pump 101 and the already existing electric motor can be retrofitted with the control unit 103 in order to enhance the stability of the pump running. The method which the control unit 103 executes is designed, for example, as a program element and stored on a computer-readable medium 109.

Figure 2:
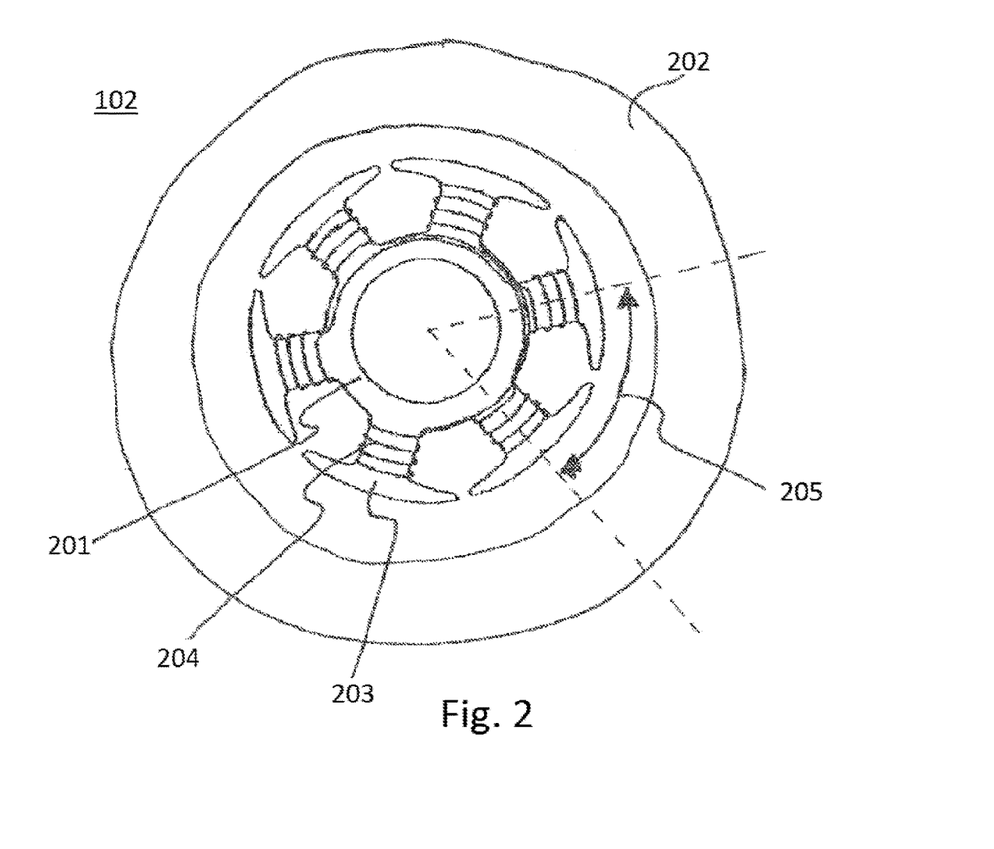
FIG. 2 is an electric motor.

FIG. 2 shows an electric motor 102 according to embodiment of the invention. In the case shown, the electric motor is designed as an external-rotor electric motor. This electric motor is merely an example and not to be viewed as limiting, and the invention can be applied to different kinds of electric motor. In this exemplary embodiment, the rotor 202 of the electric motor is arranged outside the stator 201. In the operation of the electric motor 102, the rotor 202 rotates about the stator 201. The stator 201 has several arms 203, each of which is provided with a conductor winding 204. In this example, the stator 201 has six arms. The number of arms and their geometrical arrangement is, however, merely an example and can differ from the figure shown. The rotor 202 is made from permanent magnets, for example. In order to set the motor in motion, the control unit supplies an alternating voltage to the conductor windings 204 of the arms 203. The "jitter" is ascertained, for example, by measuring the period of the rotor 202 for a partial revolution 205. In this exemplary embodiment, a partial revolution of 60° is shown. However, the invention is also applicable to periods for other partial revolutions or for whole revolutions. The rotation of the rotor 202 consisting of permanent magnets produces an induction voltage on the conductor winding 204, which is termed an electromotive force or counter-e.m.f. This period for the partial revolution 205 can be ascertained by the control unit by means of the electromotive force measured by the stator 201.

Figure 3:
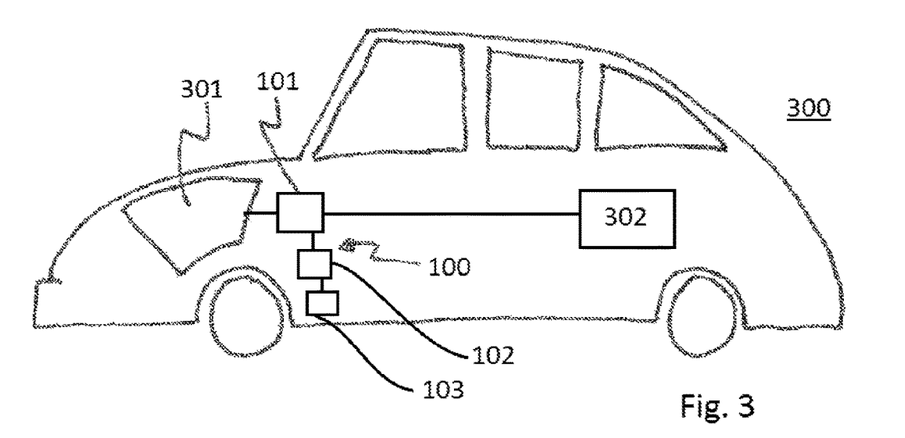
FIG. 3 is a vehicle according.

FIG. 3 shows a vehicle 300 according to one exemplary embodiment of the invention. The vehicle has an internal combustion engine 301, a fuel tank 302 and a delivery device 100, which supplies fuel to the internal combustion engine 301 from the fuel tank 302. For example, the internal combustion engine 301 is a diesel engine. The delivery device 100 contains a pump 101, an electric motor 102 for driving the pump, and a control unit 103 for controlling the electric motor 102. The control unit can be part of the engine controls, for example, or it can be retrofitted afterwards to improve the stability of the pump running.

FIG. 4 shows a flow chart of a method for controlling an electric motor of a vehicle pump for the delivery of a medium according to one exemplary embodiment of the invention. The method has the step S1 of ascertaining a period for at least one partial revolution of a rotor of the electric motor and the step S2 of altering a speed of the electric motor when the ascertained period for the partial revolution of the rotor deviates from a predetermined comparison value by a minimum amount.

FIG. 5 shows a flow chart of another method according to one exemplary embodiment of the invention. This shows steps for a method having two speed ranges. The method has the step S3 of ascertaining an instantaneous speed of the electric motor. If the ascertained instantaneous speed of the electric motor drops below a first speed limit value, step S4 is carried out to increase the speed of the electric motor if the ascertained period for the partial revolution of the rotor deviates from the predetermined comparison value by the minimum amount. If the ascertained instantaneous speed of the electric motor exceeds a second speed limit value, step S5 is carried out to increase the speed of the electric motor if the ascertained period for the partial revolution of the rotor deviates from the predetermined comparison value by the minimum amount.

In addition, it should be pointed out that "comprising" or "having" does not preclude any other elements and "one" or "a" does not preclude a plurality. Moreover, it should be pointed out that features which have been described with reference to one of the above exemplary embodiments or embodiments can also be used in combination with other features of other previously described exemplary embodiments or embodiments.

Reference numbers in the claims should not be seen as limitations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling an electric motor of a pump configured to deliver a medium, the method comprising:
   ascertaining a period for at least a partial revolution of a rotor of the electric motor;
   altering a speed of the electric motor when the ascertained period for the partial revolution of the rotor deviates from a predetermined comparison value by a minimum amount;
   detecting an electromotive force of the electric motor; and
   determining a period of the detected electromotive force of the electric motor,
   wherein the period for the partial revolution of the rotor is ascertained based on the detected electromotive force.

2. The method as claimed in claim 1, further comprising:
   calculating a difference between the determined period of the detected electromotive force of the electric motor and the predetermined comparison value; and
   altering the speed of the electric motor when an absolute magnitude of the calculated difference is greater than the minimum amount;
   wherein the predetermined comparison value is a mean value of a particular number of periods of the electromotive force of the electric motor.

3. The method as claimed in claim 1, further comprising:
   increasing the speed of the electric motor by a predefined amount when the ascertained period for the partial revolution of the rotor deviates from the predetermined comparison value by the minimum amount.

4. The method as claimed in claim 3, wherein the speed of the electric motor is increased by a predefined fixed amount.

5. The method as claimed in claim 1, further comprising:
   increasing the speed of the electric motor continually until a deviation of the period from the predetermined comparison value is less than the minimum amount when the ascertained period for the partial revolution of the rotor deviates from the predetermined comparison value by the minimum amount.

6. The method as claimed in claim 1, further comprising:
   generating and sending a warning signal to an engine control unit when the ascertained period for the partial revolution of the rotor deviates from the predetermined comparison value by the minimum amount.

7. The method as claimed in claim 1, further comprising:
   detecting an instantaneous speed of the electric motor;
   one of:
   increasing the speed of the electric motor if the detected instantaneous speed of the electric motor drops below a first speed limit value when the ascertained period for the partial revolution of the rotor deviates from the predetermined comparison value by the minimum amount;
   or
   decreasing the speed of the electric motor if the ascertained instantaneous speed of the electric motor goes beyond a second speed limit value, when the ascertained period for the partial revolution of the rotor deviates from the predetermined comparison value by the minimum amount.

8. A program element stored on a nontransient computer readable medium which, when executed on a processor, causes the processor to execute a method comprising:
   ascertaining a period for at least a partial revolution of a rotor of an electric motor;
   altering a speed of the electric motor when the ascertained period for the partial revolution of the rotor deviates from a predetermined comparison value by a minimum amount;
   detecting an electromotive force of the electric motor; and
   determining a period of the detected electromotive force of the electric motor,
   wherein the period for the partial revolution of the rotor is ascertained based on the detected electromotive force.

9. A delivery device of a vehicle, the delivery device comprising:
   a pump configured to deliver a medium;
   an electric motor having a rotor and configured to drive the pump; and
   a control unit configured to control the electric motor by:
   ascertaining a period for at least a partial revolution of the rotor;
   altering a speed of the electric motor when the ascertained period for the partial revolution of the rotor deviates from a predetermined comparison value by a minimum amount;
   detecting an electromotive force of the electric motor; and
   determining a period of the detected electromotive force of the electric motor,
   wherein the period for the partial revolution of the rotor is ascertained based on the detected electromotive force.

10. A vehicle with a delivery device as claimed in claim 9, wherein the pump of the delivery device is a fuel pump configured to deliver fuel to an internal combustion engine of the vehicle.

* * * * *